UNITED STATES PATENT OFFICE.

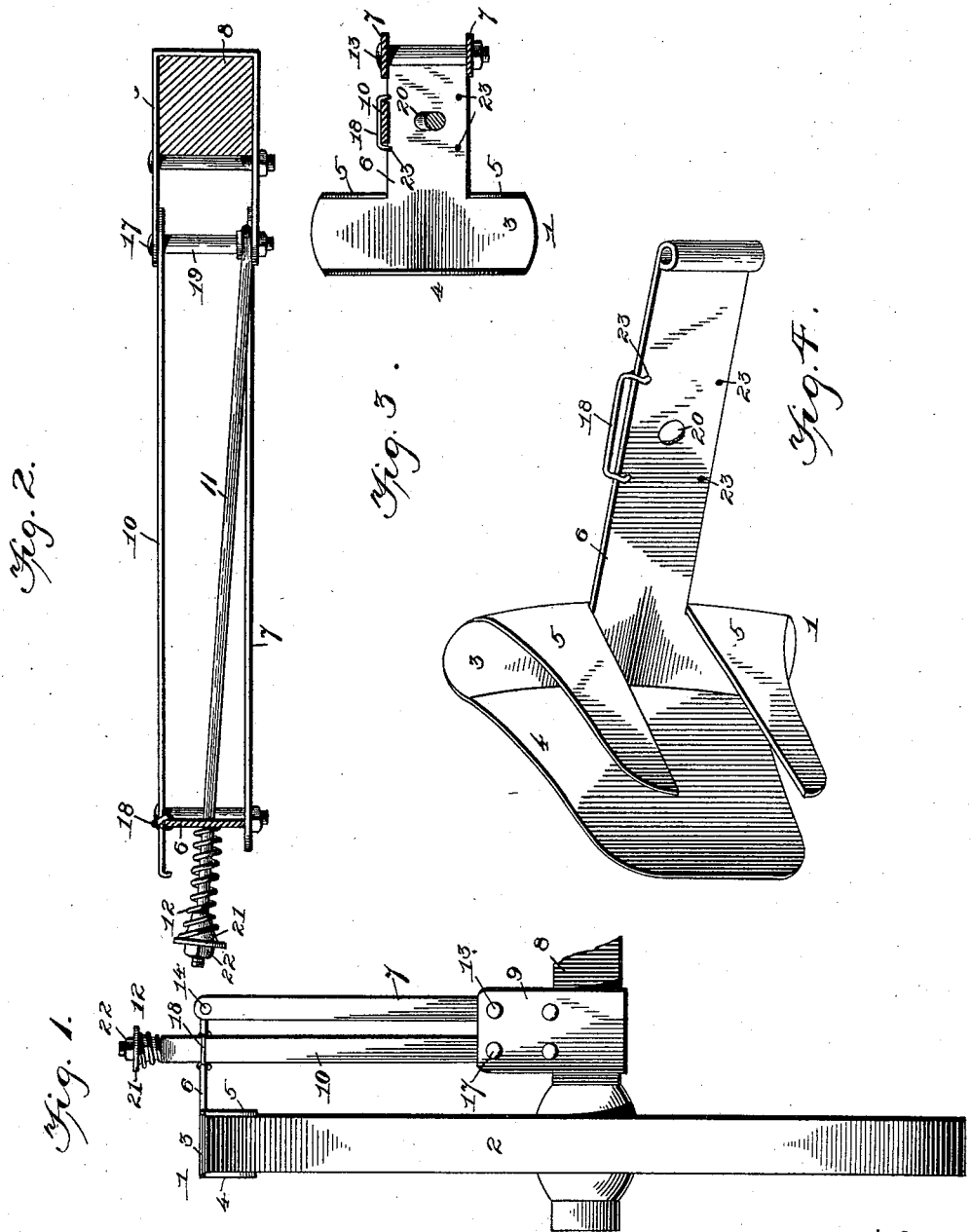

MASCENER TAYLOR, OF OCKER, TEXAS.

VEHICLE-WHEEL SCRAPER.

SPECIFICATION forming part of Letters Patent No. 581,047, dated April 20, 1897.

Application filed October 28, 1896. Serial No. 610,291. (No model.)

*To all whom it may concern:*

Be it known that I, MASCENER TAYLOR, a citizen of the United States, residing at Ocker, in the county of Bell and State of Texas, have invented a new and useful Vehicle-Wheel Scraper, of which the following is a specification.

The invention relates to improvements in vehicle-wheel scrapers.

The object of the present invention is to provide a simple, inexpensive, and efficient device adapted to be readily applied to a vehicle to prevent mud from clinging to the wheels, and thereby make the draft lighter on a horse or team, and at the same time prevent mud from being thrown upon the body of a vehicle and the occupants thereof.

The invention consists in the construction and novel combination and arrangement of parts hereinafter fully described, illustrated in the accompanying drawings, and pointed out in the claims hereto appended.

In the drawings, Figure 1 is a plan view of a portion of the running-gear provided with a vehicle-wheel scraper constructed in accordance with this invention. Fig. 2 is a longitudinal sectional view. Fig. 3 is a transverse sectional view. Fig. 4 is a detail perspective view of the mud-scraper shoe.

Like numerals of reference designate corresponding parts in all the figures of the drawings.

1 designates a scraping-shoe, located at the back of a wheel 2, and consisting of a back 3 and sides 4 and 5, and adapted to embrace the adjacent portion of the wheel 2 and scrape mud therefrom to prevent the mud from clinging to the wheel and being carried upward and thrown upon the body of the vehicle or the occupants thereof. It also lightens the draft and prevents mud from collecting on the brake-shoes. The scraping-shoe is carried by a transverse lever 6, preferably formed integral with the scraping-shoe and fulcrumed at its inner end between upper and lower bars 7 of a supporting-frame, and the side 5 of the shoe is cut, as shown, to form the lever, both the shoe and the lever being preferably stamped or otherwise formed from a single piece of metal, but they may be otherwise constructed, if desired.

The supporting-frame, which is secured to an axle 8 by a clip 9, consists of the upper and lower horizontal supporting-bars 7, a guide-bar 10, and a rod 11, which carries a spiral spring 12 for holding the scraping-shoe against the wheel. The clip 9 is substantially rectangular to conform to the configuration of the axle, and its sides are connected by bolts to secure the necessary clamping action.

The inner ends of the horizontal bars 7 are mounted on a bolt 13, and arranged within the sides of the clip 9, a spacing-sleeve being disposed on the bolt 13 and interposed between the inner ends of the bars 7. The outer ends of the bars 7 are connected by a bolt 14, forming a pivot or fulcrum for the lever 6, which is provided at its inner end with a vertical eye for the reception of the pivot-bolt 14. The guide-bar 10 is mounted at its inner end on a bolt 17 of the clip 9, and its outer portion passes through a guide-eye 18, which is located at one edge of the lever 6 at a point intermediate of the ends thereof. The rod 11 has its inner end mounted on the bolt 17, a collar or sleeve 19 being interposed between the guide-bar 10 and the rod 11, and the outer portion of the latter passes through a perforation 20 of the lever and extends beyond the same. The coiled spring 12 is mounted on the outer portion of the rod 11 and is interposed between the outer face of the lever 6 and a collar 21, which is engaged by a nut 22, arranged at the extremity of the rod and adapted to regulate the tension of the spring. The outer portion of the spiral spring is enlarged and the collar is provided with a conical extension, which fits in the enlarged portion of the spiral spring.

The device is adapted to be mounted on a running-gear adjacent to all of the wheels, and as the lower portions of the scraping-shoes become worn first the shoes, after being worn, may be reversed or changed from one side of a vehicle to the other in order to bring the unworn upper portions of them at the bottom, thereby making practically new scrapers. In order to enable the parts to be reversed, the lever is provided at its upper and lower edges with perforations 23, into which are detachably linked the terminals of the guide-eye 18, and the latter may be readily arranged at either edge of the lever, which forms an arm of the scraping-shoe.

It will be seen that the device is exceedingly simple and inexpensive in construction, that it is adapted to be readily applied to a vehicle, and that it is capable of scraping mud off the wheels to lighten the draft and prevent the mud from being carried upward and thrown on the body of the vehicle or the occupants thereof.

It will also be seen that the shoe may be readily regulated to cause it to bear against a wheel with the desired pressure and prevent it from being thrown off the same, and that after the shoes of a vehicle have become worn at the bottom they may be reversed or changed from one side of the vehicle to the other to bring their unworn top portions at the bottom.

What I claim is—

1. In a device of the class described, the combination of a longitudinally-disposed supporting-frame designed to be mounted on a vehicle and provided at its inner end with a fastening device for securing it to an axle, a transverse lever fulcrumed on the outer end of the supporting-frame, a scraping-shoe mounted on the outer end of the lever and arranged to engage the periphery of a wheel, and means for yieldingly holding the shoe against the wheel, substantially as described.

2. In a device of the class described, the combination of a longitudinal supporting-frame designed to be mounted on the axle of a vehicle, a lever extending transversely of the vehicle and fulcrumed at its inner end on the outer terminal of the frame, a scraping-shoe mounted on the outer end of the transverse lever and arranged to engage a wheel at the periphery thereof, a guide-bar receiving and supporting the lever at a point between the ends thereof, and a spring engaging the lever for holding the scraper against the wheel, substantially as described.

3. In a device of the class described, the combination of a supporting-frame provided with a guide-bar, a lever fulcrumed on the frame and provided at its upper and lower edges with perforations, a scraping-shoe carried by the lever and arranged to engage a wheel at the periphery thereof, and a guide or eye having its terminals linked in the perforations at one edge of the lever and adapted to be engaged with perforations at the opposite edges of the same, whereby the shoe is adapted to be reversed to change it from one side of a vehicle to the other, substantially as and for the purpose described.

4. In a device of the class described, the combination of a clip adapted to be secured to an axle, upper and lower supporting-bars extending from the clip and designed to be arranged parallel with a wheel, a transverse lever fulcrumed at the outer ends of the supporting-bars, a scraping-shoe carried by the lever and arranged to engage a wheel at the periphery thereof, a guide-bar extending from the clip and supporting the lever, a rod mounted on the clip and passing through a perforation of the lever, a spiral spring disposed on the rod and engaging the outer face of the lever, and a nut mounted on the outer end of the rod and adapted to regulate the tension of the spring, substantially as described.

5. In a device of the class described, the combination of a scraping-shoe adapted to engage a wheel, consisting of a back and opposite sides, and provided with a transverse arm forming a lever, said shoe and arm being constructed of a single piece of metal and the inner side of the shoe being split to form the adjacent portion of the arm, and means for supporting the arm of the scraping-shoe and for holding the latter in engagement with the wheel, substantially as described.

In testimony that I claim the foregoing as my own I have hereto affixed my signature in the presence of two witnesses.

MASCENER TAYLOR.

Witnesses:
W. T. SCHILLER,
A. OCKER.